April 24, 1962 F. H. MUELLER 3,030,975

ANGLE VALVE

Filed Dec. 18, 1959

INVENTOR
FRANK H. MUELLER

BY Cushman, Darby & Cushman
ATTORNEYS

United States Patent Office 3,030,975
Patented Apr. 24, 1962

3,030,975
ANGLE VALVE
Frank H. Mueller, Decatur, Ill., assignor to Mueller Co., Decatur, Ill., a corporation of Illinois
Filed Dec. 18, 1959, Ser. No. 860,514
9 Claims. (Cl. 137—246.22)

This invention relates to rotary plug angle valves and, more especially, to improvements in angle valves of the type shown in the patent to Mueller 2,631,002.

While the valve shown in the aforementioned patent is most satisfactory for its intended purpose, it is susceptible to improvement. In particular, the valve disclosed in the patent has no arrangement for lubricating its moving parts except at initial assembly. In other words, the valve cannot be lubricated except by disassembly. Moreover, a proper arrangement for lubricating that valve without disassembly is not an uncomplicated matter, because in the closed position of the valve there is no means for providing a closed lubricant system. Consequently, if lubricant is introduced between the moving parts of the valve when the latter is in its closed position, the lubricant will pass into the pipe line to which the valve is connected.

The valve shown in the aforementioned patent also is susceptible of having its plug readily removed from the valve body by merely unscrewing a retainer ring threaded into one end of the valve seat.

The upstream pipe line leading to an angle valve of this nature, and also pipes leading to other types of valves and pipe fittings, frequently are provided with a protective wrapping. It is obvious that such wrapping, to be most effective, should cover and seal the joint between the pipe and the valve or fitting. Present-day constructions of valves and fittings, however, render most difficult the wrapping of such a joint because there usually exists at the joint an abrupt right-angle shoulder.

Accordingly, it is an object of this invention to provide an angle valve of the type shown in the aforesaid patent with a lubricating system into which lubricant can be introduced only when such system is completely closed.

It is another object of this invention to provide an angle valve of the type under consideration that is substantially tamper-proof, i.e., the plug cannot readily be removed from the valve body.

It is still another object of this invention to provide an improved valve or pipe fitting which will greatly facilitate the wrapping of a joint between such valve or fitting and a pipe.

Other objects and advantages of the invention will become apparent from the following description and accompanying drawings in which.

Figure 1:
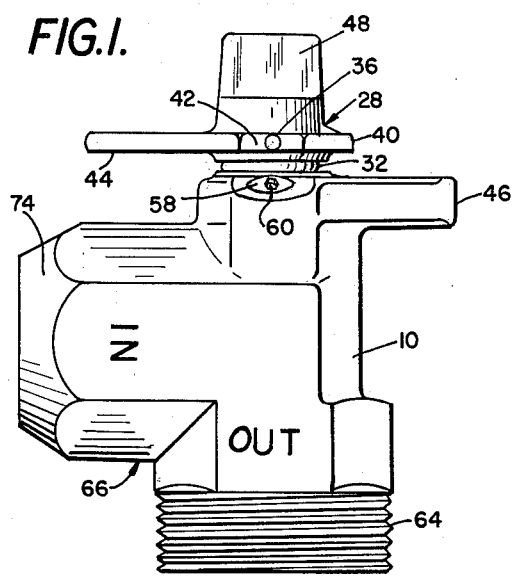
FIGURE 1 is a side elevational view of a valve embodying this invention, with the valve being shown in open position.
Figure 3:
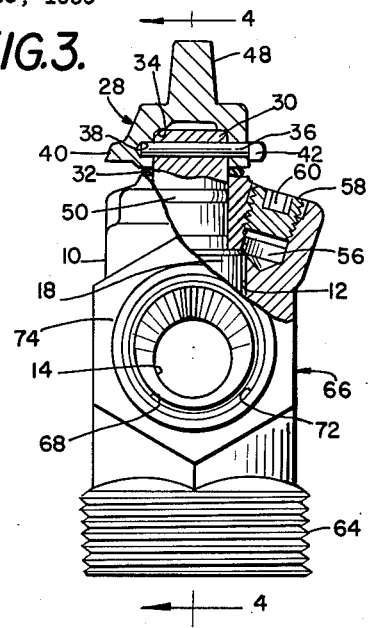
FIGURE 3 is an end view, partially in vertical section, of the valve shown in FIGURE 1 and taken from the left-hand side of the latter figure.

Referring now to the drawings there is shown an angle valve of the rotary plug type which includes a valve body 10 having a longitudinal cylindrical bore 12 forming a valve seat extending therethrough. The body 10 also has a lateral inlet port 14, preferably disposed at right angles to the bore 12 and communicating with the latter between its ends. On one side of the port 14 the bore 12 is reduced to provide a shoulder 16 facing toward the port. Rotatably mounted in the bore 12, is a tubular cylindrical valve plug 18 having a closed end 20 and an open end 22. The plug 18 is provided with a lateral inlet port 24, while its open end 22 defines an outlet port communicating with the larger bore portion which forms an outlet from the body 10. At its closed end 20 and beyond its lateral port 24, the plug 18 is reduced in diameter to provide a shoulder 26 engageable with the bore shoulder 16. When the plug 18 is in open position, the plug inlet port 24 is adapted to register with the body inlet port 14. In this position of registry, the shoulders 16 and 26 are adapted to be substantially in engagement.

The plug 18 is retained in the bore 12, with the shoulders 16 and 26 substantially in engagement, by a cap 28 secured to an extension of the reduced end of the plug which forms a stem 30 projecting out of the bore. Interposed between the cap 28 and the corresponding end of the valve body 10 is a resilient ring 32, such as an O-ring, which serves both as a weather seal and as a spring to urge the shoulder 26 into engagement with the shoulder 16. The cap 28 is provided with a socket 24 for snug reception of the stem 30 and is secured to the latter by a pin 36 which extends, with a force fit, through an aperture in one side wall of the cap, through a transverse bore in the stem, and into a blind socket 38 in the other side wall of the cap. Thus, removal of the cap 28, even by attempting to drill out the pin 36, is a difficult operation.

The cap 28 also is provided with a circumferential flange 40 constituting a shield closely overlying the adjacent end of the valve body 10. A notch 42 is provided in one side of the flange 40 for purposes later explained. Preferably, the pin-receiving aperture in the side wall of the cap 28 is at the bottom of the notch 42. The flange 40 may be enlarged at one side to provide an apertured lock wing 44 adapted to be moved into alignment with a corresponding apertured lock wing 46 on the valve body 10 in the closed position of the plug 18. The valve may be locked in such position by any appropriate locking device, such as a padlock 47 extending through the registering apertures in the lock wings 44 and 46. Outwardly beyond the flange 40, the cap 28 preferably is provided with a flattened portion 48 for the reception of an appropriate turning tool (not shown), such as a wrench.

The reduced portion of the plug 18 is provided with a circumferential groove in which is disposed an O-ring 50, or an equivalent resilient sealing ring, to provide a seal between the reduced portion of the plug and the opposed surface of the bore 12. While an effective seal may be provided by an O-ring disposed in a circumferential groove in the wall of the bore 12 and having sealing engagement with the surface of the plug 18, it is somewhat easier, in the manufacturing process, to form the O-ring groove in the plug, as shown.

Figure 4:
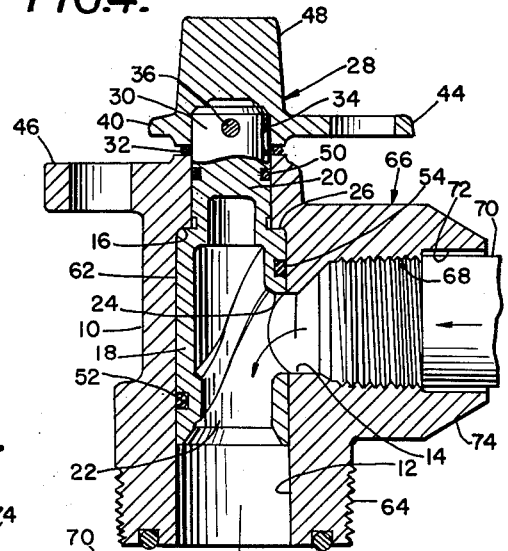
FIGURE 4 is a vertical sectional view taken substantially on line 4—4 of FIGURE 3 and showing the valve connected to an inlet pipe.
Figure 5:
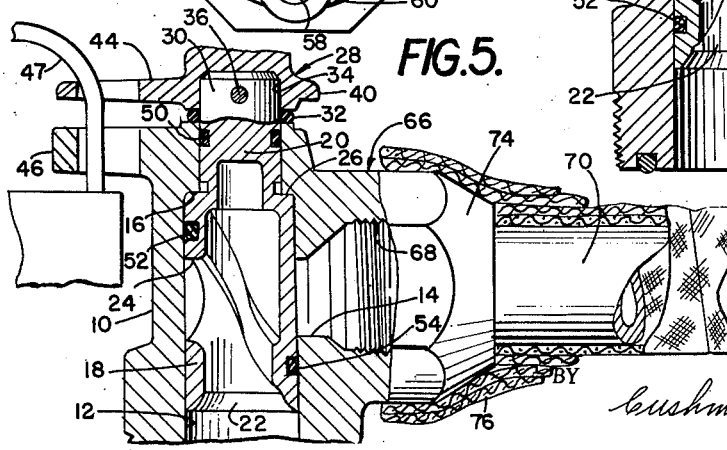
FIGURE 5 is a fragmentary view corresponding to FIGURE 4 but showing the valve in closed position.

As described in more detail in the above-mentioned patent, the outer surface of the plug 18 is provided with an encircling diagonal groove 52 which also encircles the axis of the plug lateral port 24 in a plane inclined to the plug axis and disposed to pass between the plug lateral port and the closed end 20 of the plug. With this arrangement, it will be seen that when the plug 18 is in closed position, as shown in FIGURE 5, the plane of the groove 52 will lie between the body inlet port 14 on the one hand, and the plug inlet and outlet ports 24 and 22 on the other hand. When the plug 18 is in open position, as shown in FIGURE 4, all three ports 14, 22, and 24 lie on the same side of the plane of the groove 52. Disposed in the groove 52, in sealing engagement therewith and with the opposed surface of the bore 12, is an O ring 54, or equivalent resilient sealing ring of the type which increases its sealing effectiveness on the imposition of fluid pressure thereon.

Figure 2:
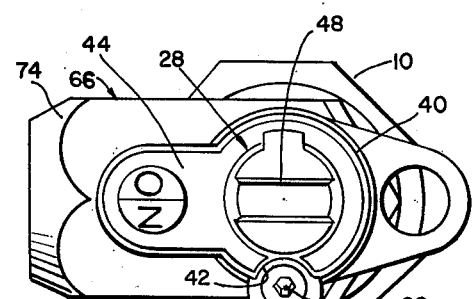
FIGURE 2 is a plan view of the valve shown in FIGURE 1.

A lubricant charging port 56 is provided in the valve body 10 in the end thereof adjacent the reduced portion of the bore 12. The port 56, which is interiorly threaded for the reception of a closure and lubricant-charging threaded plug 58, is inclined slightly outwardly from the longitudinal axis of the bore 12, and communicates with the latter substantially at the juncture of the larger portion of the bore with the shoulder 16. The charging port 56 is so located that it is in registry with the notch 42 in the cap 28 when the valve plug 18 is in open position, as shown best in FIGURES 1 and 2. In this position of the parts, it will be seen that the closure plug 58 can be removed for filling the port 56 with lubricant and after the plug has been replaced, an appropriate wrench (not shown) can be applied to a noncircular socket 60 therein for screwing the plug inwardly to force the lubricant into the space between the valve plug 18 and the bore 12. In any other position of the valve plug 18, however, it will be seen that the circumferential flange 40 on the cap 28 will closely overlie the closure plug 58 and thus prevent not only removal thereof but also access thereto for screwing the same inwardly.

A radially thin annular space exists between the plug 18 and its seat 12 because a certain amount of clearance is necessary between the plug and seat of a cylindrical rotary plug valve in order to permit assembly and rotation of the plug. When the valve plug 18 is in open position, as shown in FIGURE 4, the two O-rings 50 and 54 form end seals for a section of such annular space to define an annular chamber 62. It will be seen that because of the flange 40, lubricant under pressure can be introduced into this annular chamber 62 only when the valve is in open position. Such lubricant, however, not only increases the sealing effectiveness of the O-rings 50 and 54, but also facilitates turning of the plug 18 after extended periods of disuse. Because of the resilience of the ring 32 the valve plug 18 can shift axially toward the larger portion of the bore 12. Consequently, the introduction of lubricant under pressure into the chamber 62 will separate the shoulders 16 and 26 slightly and thus increase somewhat the size of the chamber 62 to enable additional lubricant to be charged. Moreover, the ring 32 constantly urges the valve plug 18 in a direction to engage the shoulders 16 and 26 so that pressure is maintained on the lubricant in the chamber 62.

In the closed position of the valve, the annular lubricant chamber 62 will be exposed to the upstream side of the line, i.e., to the body inlet port 14, as shown in FIGURE 5. Such exposure is not a disadvantage, however, because line pressure will be exerted on the lubricant in such chamber 62 to prevent extrusion of lubricant out of the chamber. Moreover, in the closed position of the valve it will be seen that the O-ring 50 still maintains an effective seal to prevent escape of lubricant, or line fluid, out of the valve at the smaller end of the bore 12. Additionally, in the closed position of the valve the closure plug 58 cannot be removed, thus eliminating any possibility of escape of lubricant or line fluid out of the lubricant charging port 56, when the lubricant chamber 62 is exposed to line pressure.

The valve body 10 may be provided with means adjacent the larger end of the bore 12, such as the exterior threads 64, for connecting the valve, as by a coupling nut (not shown), to a discharge pipe or the like (not shown). An exterior annular boss 66 surrounds the body inlet port 14 and is provided with interior threads 68, which may be of the tapered or iron pipe type, in order to connect the valve to the exteriorly threaded end of an inlet pipe 70. Outwardly beyond the threads 68 the boss 66 is provided with a smooth-walled counterbore 72 of slightly greater diameter than the pipe 70. When the valve is connected to an inlet pipe, the thread joint therebetween normally is covered with thread dope that, in the course of making up the joint, is squeezed out from between the threads into the annular space between the pipe 70 and the wall of the counterbore 72. The presence of dope in such annular space obviously protects the joint threads against weather corrosion. Even in the absence of dope in such space, it will be seen that the close covering of the pipe 70 by the boss 66 outwardly beyond the threads will serve to some extent to protect the threads against weather.

The exterior of the boss 66 preferably is noncircular in configuration, such as hexagonal, as shown in the drawings, for engagement by a wrench (not shown) to facilitate connecting the valve with a threaded end of a pipe. Adjacent its end the boss 66 is exteriorly bevelled or provided with a frusto-conical configuration 74, so that the boss tapers down to a relatively thin radial wall thickness at its terminal end. The reason for this configuration 74 is that pipes frequently are provided with a protective wrapping 76 of flexible ribbon-like material, as shown in FIGURE 5. When the wrapping being wound about a pipe by a workman reaches a valve or similar pipe fitting, it is extremely desirable that the wrapping be wound or applied for a short distance over the valve or fitting in order to effectively cover and seal the joint therebetween. Until the development of this invention, however, the sealing of such a joint with wrapping has been extremely difficult because a threaded bell and socket joint of the type illustrated between the valve body and the pipe usually results in an abrupt right-angle shoulder between the fitting and the pipe. By reason of the tapered boss construction, however, it will be seen that the wrapping 76 can be extended smoothly from the pipe 70 over the tapered portion 74 of the boss 66, and even slightly therebeyond over the hexagonal portion, with considerable ease. Thus, the joint can be effectively and easily covered and sealed from the weather.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. An angle valve comprising: a valve body having a circular through bore forming a valve seat and a lateral inlet port communicating with said bore; a tubular valve plug rotatably mounted in said seat to open and close the valve and having a closed end, an open end, and a lateral port registering with said body inlet port in the valve-open position of said plug; a diagonally disposed groove in the outer surface of said plug encircling both said plug and the axis of said plug port in a plane passing between the latter and said plug closed end; a resilient sealing ring in said groove engaged therewith and with said seat; means defining a circumferential groove in one of the opposed surfaces of said plug and seat adjacent said closed end; a resilient sealing ring in said circumferential groove engaged therewith and with the other of said opposed surfaces; a lubricant charging port in said body for introducing lubricant between said plug and seat between said rings; and means rotatable with said plug and covering said charging port to prevent access thereto except in the open position of the valve.

2. The structure defined in claim 1 including opposed engageable shoulders on the plug and seat for retaining said plug against axial movement in the direction of its closed end, an extension on said closed end outwardly beyond said seat, and means on said extension engaged with the valve body for retaining said plug against axial movement in the direction of its open end.

3. The structure defined in claim 1 including opposed engageable shoulders on the plug and seat for retaining said plug against axial movement in the direction of its closed end, an extension on said closed end outwardly beyond said seat, means on said extension engaged with the valve body for retaining said plug against axial movement in the direction of its open end, and resilient means engaged between said retaining means and said body for allowing a limited degree of axial movement of said plug while constantly urging said plug shoulder toward said seat shoulder.

4. The structure defined in claim 1 including an extension on the plug closed end outwardly beyond the seat, and in which the lubricant charging port is adjacent said closed end and the access-preventing means comprises a circular flange fixed on said extension and having a notch registering with said charging port in the open position of the valve.

5. An angle valve comprising: a valve body having a through bore forming a valve seat and a lateral inlet port communicating with said bore; a tubular valve plug rotatably mounted in said seat to open and close the valve and having a closed end, an open end, and a lateral port registering with said body inlet port in the valve-open position of said plug; a diagonally disposed groove in the outer surface of said plug encircling both said plug and the axis of said plug port in a plane passing between the latter and said plug closed end; a resilient sealing ring in said groove engaged therewith and with said seat; means defining a circumferential groove in one of the opposed surfaces of said plug and seat adjacent said closed end; a resilient sealing ring in said circumferential groove engaged therewith and with the other of said opposed surfaces; means for retaining said plug in said seat; a lubricant charging port in said body for introducing lubricant between the opposed surfaces of said plug and seat between said sealing rings; a removable closure for said charging port; and shield means fixed to and rotatable with said plug and overlying said closure for preventing removal thereof, said shield means having an access notch therein registering with said closure in the open position only of said plug.

6. The structure defined in claim 5 in which the retaining means includes opposed shoulders on said plug and seat between said sealing rings.

7. The structure defined in claim 6 in which the retaining means further includes an extension on the closed end of the plug projecting outwardly beyond the seat and washer-like means fixed on said extension and engaged with the body.

8. The structure defined in claim 6 in which the retaining means further includes an extension on the closed end of the plug projecting outwardly beyond the seat and washer-like means fixed on said extension, and a resilient ring encircling said extension and engaged between said washer-like means and the body to permit a limited degree of axial movement of said plug.

9. An angle valve comprising: a valve body having a circular through bore forming a valve seat and a lateral inlet port communicating with said bore; a tubular valve plug rotatably mounted in said seat to open and close the valve and having a closed end, an open end, and a lateral port registering with said body inlet port in the valve-open position of said plug; a diagonally disposed groove in the outer surface of said plug encircling both said plug and the axis of said plug port in a plane passing between the latter and said plug closed end; a resilient sealing ring in said groove engaged therewith and with said seat; means defining a circumferential groove in one of the opposed surfaces of said plug and seat adjacent said closed end; a resilient sealing ring in said circumferential groove engaged therewith and with the other of said opposed surfaces; opposed engageable shoulders on said plug and seat for retaining said plug against axial movement in the direction of said closed end; an extension on said plug closed end outwardly beyond said seat; means on said extension engaged with said valve body for retaining plug against axial movement in the direction of said open end; resilient means engaged between said retaining means and said body for allowing a limited degree of axial movement of said plug while constantly urging said plug shoulder toward said seat shoulder; and means for introducing lubricant between said plug and seat between said rings.

References Cited in the file of this patent

UNITED STATES PATENTS

| | | |
|---|---|---|
| 318,925 | Patterson | May 26, 1885 |
| 425,050 | Roberts | Apr. 8, 1890 |
| 1,634,722 | Nordstrom | July 5, 1927 |
| 2,296,650 | Mueller | Sept. 22, 1942 |
| 2,631,002 | Mueller | Mar. 10, 1953 |
| 2,693,815 | Gould | Nov. 9, 1954 |
| 2,708,096 | Mueller | May 10, 1955 |